United States Patent
Hagberg

(10) Patent No.: US 12,172,254 B2
(45) Date of Patent: Dec. 24, 2024

(54) POWER TOOL OPERATOR PROTECTION SYSTEM AND METHOD

(71) Applicant: HUSQVARNA AB, Huskvarna (SE)

(72) Inventor: Albin Hagberg, Jönköping (SE)

(73) Assignee: HUSQVARNA AB, Huskvarna (SE)

( * ) Notice: Subject to any disclaimer, the term of this patent is extended or adjusted under 35 U.S.C. 154(b) by 462 days.

(21) Appl. No.: 17/615,740

(22) PCT Filed: Jun. 29, 2020

(86) PCT No.: PCT/SE2020/050679
§ 371 (c)(1),
(2) Date: Dec. 1, 2021

(87) PCT Pub. No.: WO2021/002794
PCT Pub. Date: Jan. 7, 2021

(65) Prior Publication Data
US 2022/0241920 A1 Aug. 4, 2022

(30) Foreign Application Priority Data
Jul. 4, 2019 (SE) .................................... 1950847-2

(51) Int. Cl.
*B23Q 11/00* (2006.01)
*B25F 5/00* (2006.01)
(Continued)

(52) U.S. Cl.
CPC ............ *B23Q 11/0082* (2013.01); *B25F 5/00* (2013.01); *B27G 19/003* (2013.01); *B27G 21/00* (2013.01);
(Continued)

(58) Field of Classification Search
CPC ....... B25F 5/00; B27G 21/00; B23Q 11/0082; B23Q 11/00; Y10T 83/081; B23B 45/00
See application file for complete search history.

(56) References Cited

U.S. PATENT DOCUMENTS

| 5,942,975 A | 8/1999 | Soerensen |
| 7,936,094 B2 * | 5/2011 | Rossi ...................... F16P 3/145 |
| | | 307/326 |

(Continued)

FOREIGN PATENT DOCUMENTS

| AU | 2011289336 B2 | 4/2015 |
| AU | 2015203185 A1 | 7/2015 |

(Continued)

OTHER PUBLICATIONS

Search Report and Office Action for Swedish Application No. 2050466-8 mailed Dec. 17, 2020.
(Continued)

*Primary Examiner* — Mirza F Alam
(74) *Attorney, Agent, or Firm* — Burr & Forman LLP

(57) ABSTRACT

A power tool operator protection system comprises a plurality of wearable position sensors configured to be worn by an operator of a handheld power tool; a power tool position sensor configured to detect the position of a handheld power tool; and processing equipment configured to generate a model of the operator based on the mutual positions of the respective wearable sensors relative to each other, the mutual positions defining the operator's posture; associate each of a plurality of limbs (32*a-g*) of the operator with a respective protection volume (30*a-g*); and based on the position and/or motion of the power tool in relation to the protection volume (30*a-g*) indicating an imminent danger that the working implement enters a protection volume (30*a-g*), generate a protection signal.

20 Claims, 5 Drawing Sheets

(51) Int. Cl.
  *B27G 19/00* (2006.01)
  *B27G 21/00* (2006.01)
  *F16P 3/14* (2006.01)
  *G01C 19/04* (2006.01)
  *G01P 15/02* (2013.01)
  *G01S 19/42* (2010.01)

(52) U.S. Cl.
  CPC ............... *F16P 3/14* (2013.01); *G01C 19/04* (2013.01); *G01P 15/02* (2013.01); *G01S 19/42* (2013.01)

(56) References Cited

U.S. PATENT DOCUMENTS

| | | | |
|---|---|---|---|
| 8,316,547 | B2 | 11/2012 | Hecht et al. |
| 10,736,213 | B2 | 8/2020 | Longinotti-Buitoni et al. |
| 10,864,651 | B2 | 12/2020 | Gass et al. |
| 10,865,941 | B2 | 12/2020 | Lewis |
| 11,829,519 | B1 * | 11/2023 | Moschella ........... G06V 10/774 |
| 2004/0181951 | A1 | 9/2004 | Wittke |
| 2007/0085502 | A1 | 4/2007 | Graves |
| 2010/0064532 | A1 | 3/2010 | Wittke et al. |
| 2010/0180740 | A1 | 7/2010 | Krapf et al. |
| 2010/0194209 | A1 | 8/2010 | Richter |
| 2012/0000682 | A1 | 1/2012 | Grazioli |
| 2014/0166323 | A1 | 6/2014 | Cooper |
| 2016/0279752 | A1 * | 9/2016 | Zipf ....................... G08B 21/02 |
| 2016/0310064 | A1 | 10/2016 | Cheng |
| 2017/0107090 | A1 * | 4/2017 | Mondal ................ G07C 5/0808 |
| 2017/0173749 | A1 | 6/2017 | Stock et al. |
| 2017/0273374 | A1 | 9/2017 | Howland et al. |
| 2018/0108241 | A1 * | 4/2018 | Wong ...................... G01P 15/18 |
| 2018/0153444 | A1 | 6/2018 | Yang et al. |
| 2018/0211345 | A1 | 7/2018 | Bean et al. |
| 2019/0061159 | A1 | 2/2019 | Domae et al. |

FOREIGN PATENT DOCUMENTS

| | | |
|---|---|---|
| CA | 2810325 C | 8/2019 |
| CH | 712468 A1 | 11/2017 |
| CN | 101287578 A | 10/2008 |
| CN | 206085226 U | 4/2017 |
| CN | 109476033 A | 3/2019 |
| CN | 106132649 B | 11/2019 |
| CN | 105637281 B | 2/2020 |
| CN | 212634532 U | 3/2021 |
| DE | 10227749 A1 | 1/2004 |
| DE | 102006002668 A1 | 7/2007 |
| DE | 102006014819 A1 | 10/2007 |
| DE | 102018222393 A1 | 6/2020 |
| DE | 102018251705 A1 | 7/2020 |
| DE | 102019103778 A1 | 8/2020 |
| DE | 102019211894 A1 | 2/2021 |
| EP | 2020275 A3 | 7/2013 |
| EP | 3296064 A1 | 3/2018 |
| EP | 3432782 A1 | 1/2019 |
| EP | 3616860 A2 | 3/2020 |
| FR | 2712837 A1 | 6/1995 |
| FR | 2831476 A1 | 5/2003 |
| FR | 2846729 B1 | 2/2005 |
| GB | 2587774 A | 4/2021 |
| JP | 2012148359 A | 8/2012 |
| KR | 1668693 B1 | 10/2016 |
| KR | 101713622 B1 | 3/2017 |
| NZ | 579017 A | 7/2012 |
| WO | 1996037350 A1 | 11/1996 |
| WO | 03006213 A2 | 1/2003 |
| WO | 2005099981 A1 | 10/2005 |
| WO | 2011117091 A1 | 9/2011 |
| WO | 2012025458 A1 | 3/2012 |
| WO | 2012177751 A1 | 12/2012 |
| WO | 2013080233 A1 | 6/2013 |
| WO | 2015140770 A2 | 9/2015 |
| WO | 2015169342 A1 | 11/2015 |
| WO | 2016124415 A1 | 8/2016 |
| WO | 2017165757 A1 | 9/2017 |
| WO | 2017197308 A1 | 11/2017 |
| WO | 2021043558 A1 | 3/2021 |
| WO | 2021043740 A1 | 3/2021 |

OTHER PUBLICATIONS

International Search Report and Written Opinion for International Application No. PCT/SE2021/050371 mailed Sep. 6, 2021.
Search Report and Office Action for Swedish Application No. 1950847-2 mailed Jan. 27, 2020.
International Search Report and Written Opinion for International Application No. PCT/SE2020/050679 mailed Oct. 16, 2020.

* cited by examiner

POWER TOOL OPERATOR PROTECTION SYSTEM AND METHOD

FIELD OF THE INVENTION

The present invention relates to a power tool operator protection system, and to a method of protecting an operator of a handheld power tool from injury.

BACKGROUND

US 2010/0064532 A1 suggests a power tool operator protection system intended for protecting a chainsaw operator from cutting him/herself. The system keeps track of the separation distances between sensors placed on the chainsaw cutting bar and the operator's body, and stops the power tool if the separation distances fall within a threshold. However, there is a need for an even more efficient, accurate, and reliable protection system.

SUMMARY

It is an object of the present invention to solve, or at least mitigate, parts or all of the above mentioned problems. To this end, there is provided a power tool operator protection system comprising a plurality of wearable position sensors configured to be worn by an operator of a handheld power tool; a power tool position sensor configured to detect the position of a handheld power tool; and processing equipment configured to: receive position data from the wearable position sensors and the power tool position sensor; based on the position data received from the wearable position sensors, generate a model of the operator, the model representing the operator's posture and being based on the mutual positions of the respective wearable sensors relative to each other; associate each limb of a plurality of limbs of the operator, as represented by the model, with a respective protection volume; based on the position data received from the power tool position sensor, determine a position of a working implement of the power tool; and, based on the position and/or motion of the power tool in relation to the protection volume indicating an imminent danger that the working implement enters a protection volume, generate a protection signal. The protection signal may alert a user or activate a safety function of the tool, such that the risk of accidents due to the working implement engaging with the body of the operator may be reduced. According to an embodiment, the processing equipment may be configured to generate the protection signal based on the working implement having already entered the boundaries of the protection volume.

According to other embodiments, the protection signal may be generated already when the working implement is adjacent to the protection volume. The wearable position sensors may be configured to communicate wirelessly with the processing equipment. Similarly, the power tool position sensor may be configured to communicate wirelessly with the processing equipment. Alternatively, the processing equipment may be mechanically integrated with, and wired to, the power tool position sensor or the wearable position sensors. The model of the operator may be a skeleton model, or any other suitable representation of the operator which allows defining the operator's posture.

According to embodiments, the processing equipment may further be configured to associate the working implement of the power tool with a working implement model; and determine whether there is an imminent danger that the working implement model overlaps with a protection volume. Thereby, the geometry of the power tool may be accounted for, such that it may be possible to work with e.g. an elongate working implement closer to the body. The working implement model may represent the working implement in one, two, or three dimensions. Moreover, the power tool position sensor can be mounted to a portion of the power tool which is geometrically separated from the working implement, while still allowing accurate triggering of a protection signal. By way of example, the power tool position sensor may be allowed to enter the protection volumes without triggering the generation of a protection signal, as long as the model of the power tool's working implement remains outside the protection volumes.

According to embodiments, the processing equipment may further be configured to associate the working implement of the power tool with a working implement volume; and determine whether there is an imminent danger that the working implement volume overlaps with a protection volume.

According to embodiments, the processing equipment may further be configured to: determine a speed at which the working implement approaches a protection volume, and adapt a safety distance for generating the protection signal based on the determined speed. Thereby, the operator may be permitted to operate the power tool with the working implement close to the body without generating any protection signals, while still maintaining a high level of safety. A substantial fraction of chainsaw kickback incidents are initiated with the guide bar relatively far from the operator's body, and a relatively early generation of a protection signal in response to such an incident may increase operator safety.

According to some embodiments, the processing equipment may be configured to, based on the protection signal, stop the working implement of the power tool. According to other embodiments, the working implement may be allowed to continue at a reduced power, or a mechanical guard element may be actuated to prevent contact between the working implement and the operator's body.

According to embodiments, the processing equipment may be configured to, based on the protection signal, generate an alert to the operator. The alert may, for example, be an audible alert, which may be transmitted via e.g. a buzzer or speaker; a visual alert, which may be transmitted via e.g. a display unit or a light source; or a haptic alert, which may be transmitted via e.g. a vibrator. The processing equipment may be configured to take different control actions associated with different respective safety distance. By way of example, the processing equipment may issue an audible warning signal when the working implement is at a first, relatively longer, distance from the protection volume, and stop the working implement when the working implement is at a second, relatively shorter distance from the protection volume.

According to embodiments, each of the operator's legs may be associated with a respective protection volume. Optionally, the operator's head may be associated with a respective protection volume. Optionally, the operator's torso may be associated with a respective protection volume. Optionally, each of the operator's arms may be associated with a respective protection volume.

According to embodiments, each of the position sensors may be configured to determine an absolute position in space.

According to embodiments, each respective position sensor of said position sensors may be configured to determine a relative position in space, said relative position being relative to the other position sensors.

According to an embodiment, the power tool position sensor is further configured to detect an orientation of the power tool. Thereby, if the power tool position sensor is not attached directly to the working implement, a more accurate position of the working implement may be obtained. Similarly, each of the wearable position sensors may be configured to detect a respective orientation. Thereby, the number of wearable sensors for determining the operator's posture may be reduced.

According to embodiments, each of said wearable position sensors may comprise an inertial measurement unit, such as a gyroscope or an accelerometer. Thereby, the positions of the wearable position sensors may be tracked from a known starting position. Alternatively, the positions of the wearable positions may be calibrated based on the operator's movements, without any known starting position, by fitting the operator's movements to a kinematic model of the operator. Optionally, also the power tool position sensor may operate in the same manner.

According to embodiments, the power tool operator protection system may comprise a GNSS, global navigation satellite system, receiver. Optionally, each of the wearable position sensors may comprise a GNSS receiver. Still optionally, the power tool position sensor may comprise a GNSS receiver.

According to embodiments, the power tool operator protection system may further comprise an RTK, real-time kinematic, base station, wherein each of said wearable position sensors comprises an RTK enabled GNSS receiver. The RTK base station may be configured to transmit correction data for resolving any position ambiguity of the GNSS signal. The base station may be positioned on e.g. a parked forestry terrain vehicle, or on other forestry equipment, such as on a portable tool case for handheld forestry tools.

According to embodiments, the power tool operator protection system may further comprise a plurality of radio beacons, wherein each of said wearable position sensors comprises a respective radio interface, the position of the wearable position sensors being determined by detected distances from the respective wearable position sensors to each of said radio beacons. Optionally, also the power tool position sensor may operate in the same manner. Each radio beacon may be configured to transmit a respective radio signal to the position sensors. Alternatively or additionally, each beacon may be configured to receive a radio signal from each respective position sensor.

According to embodiments, the position of each limb may be determined based on input from several different sensors. Data from different sensors may be fused using various techniques, such as SLAM, simultaneous localization and mapping. Moreover, position data from sensors carried by one limb may be used for determining the position of another limb.

According to embodiments, the processing equipment may be configured to determine the position of one body part based on position data from a wearable position sensor attached to another body part. By way of example, the relative positions of the operator's foot and head, combined with a model representing the lengths of the operator's torso and the upper and lower parts of the operator's leg, may be enough for determining within a certain statistical confidence operator's posture, including the operator's knee bending angle and the positions of the upper and lower parts of the operator's legs. Moreover, the motions of the operator's limbs are typically interrelated, such that not all limbs need to be provided with wearable sensors for generating a complete kinematic model, the model having an at least reasonable statistical confidence, of the operator's body. The positions or motions of the limbs and body parts not provided with respective wearable sensors may be determined by feeding the wearable sensor data to e.g. an artificial neural network or any other suitable AI, artificial intelligence, implementation.

According to embodiments, the power tool operator protection system may further comprise an electronically actuated working implement brake connected to the power tool, wherein the working implement brake is configured to, based on the protection signal, mechanically engage to stop a motion of the working implement.

According to embodiments, the handheld power tool may be a handheld cutting tool such as a chainsaw. Alternatively, the handheld power tool may be e.g. a hedge trimmer.

According to embodiments, the power tool position sensor may be fixedly attached to the power tool.

According to embodiments, the power tool position sensor may be integrated within a power tool housing.

According to embodiments, the wearable position sensors may be integrated into workwear such as a jacket, trousers, gloves, or boots.

According to embodiments, the workwear may be protection wear configured to mechanically protect the operator from injury. The protection wear may, for example, be chainsaw protection wear, such as a chainsaw protection helmet, chainsaw protection trousers, or chainsaw protection boots.

According to embodiments, the processing equipment may also be configured to: receive position data from wearable position sensors worn by an adjacent person; based on the position data received from the wearable position sensors of the adjacent person, generate a model of the adjacent person, the model representing the adjacent person's posture and being based on the mutual positions of the respective wearable sensors of the adjacent person relative to each other; associate each limb of a plurality of limbs of the adjacent person, as represented by the model of the adjacent person, with a respective protection volume of the adjacent person; and based on the position and/or motion of the power tool in relation to the protection volume of the adjacent person indicating an imminent danger that the working implement enters a protection volume of the adjacent person, generate a protection signal. Thereby, also people adjacent to the operator of the power tool may be protected from injury. The wearable sensors of the adjacent person may be of the same type as the wearable sensors of the operator, and the model and protection volumes of the adjacent person may be generated in the same manner.

According to a second aspect, parts or all of the above mentioned problems are solved, or at least mitigated, by a method of protecting an operator of a handheld power tool from injury, the method comprising: receiving position data from wearable position sensors worn by the operator; receiving position data from a power tool position sensor; based on the position data received from the wearable position sensors, generating a model of the operator, the model (26) representing the operator's posture and being based on the mutual positions of the respective wearable sensors relative to each other; associating each limb of a plurality of limbs of the operator, as represented by the model, with a respective protection volume; based on the position data received from the power tool position sensor, determining a position of a working implement of the power tool; and based on the position and/or motion of the power tool in relation to the protection volume indicating an imminent danger that the working implement enters a protection volume, generating a protection signal.

It is noted that embodiments of the invention may be embodied by all possible combinations of features recited in the claims. Further, it will be appreciated that the various embodiments described for the power tool operator protection system defined hereinabove are all combinable with the method as defined in accordance with the second aspect, and vice versa.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

All the figures are schematic, not necessarily to scale, and generally only show parts which are necessary in order to elucidate the embodiments, wherein other parts may be omitted.

DETAILED DESCRIPTION OF THE EXEMPLARY EMBODIMENTS

Figure 1:
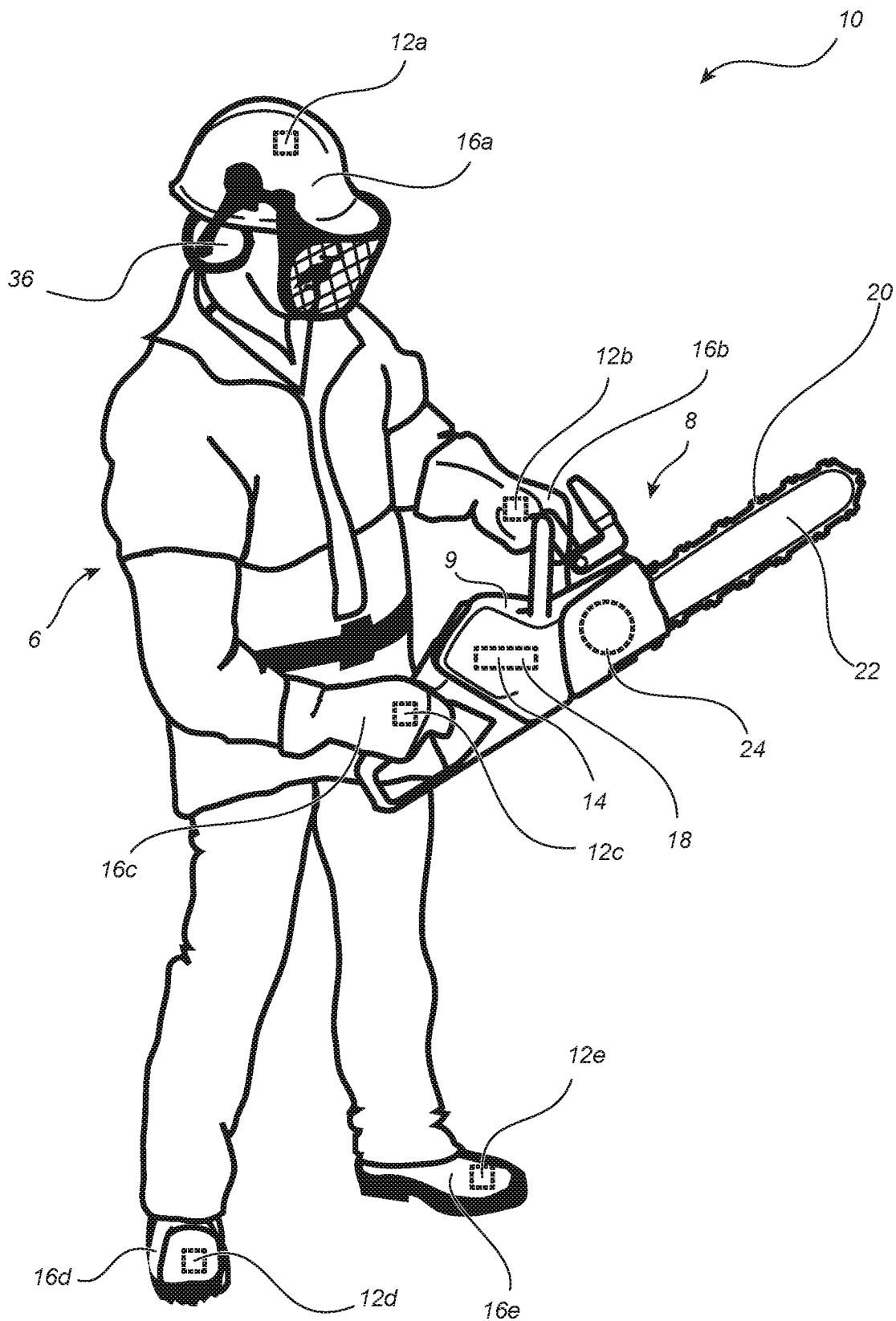
FIG. 1 is a schematic view in perspective of a personal protection system applied to a chainsaw operator operating a chainsaw.

FIG. 1 illustrates a chainsaw operator 6 operating a chainsaw 8. The operator 6 is protected by a power tool operator protection system 10 comprising a plurality of wearable position sensors 12a-e, integrated into the operator's workwear, and a power tool position sensor 14 integrated within the housing 9 of the chainsaw 8. The wearable position sensors 12a-e are embodied as accelerometers, and are as such configured to identify any movement as well as the orientation of the respective sensor 12a-e in relation to the vertical direction. The wearable sensors 12a-e are integrated into the operator's chainsaw protection helmet 16a, protection gloves 16b-c, and protection boots 16d-e, respectively. The power tool position sensor 14 is co-located with a controller 18 of the power tool operator protection system 10. Also the power tool position sensor 14 is embodied as an accelerometer, and thereby senses the motion as well as orientation of the sensor 14. The controller 18 is configured to wirelessly receive position data from the wearable position sensors 12a-e, and to receive the position of the power tool position sensor 14 and, based on the position data received from the wearable position sensors 12a-e and the power tool position sensor 14, generate a model of the operator 6 and chainsaw 8 in a manner which will be elucidated further below.

The chainsaw 8 comprises an endless saw chain 20 configured to be rotated about the periphery of a guide bar 22 by a drive motor (not shown) located within the housing 9 of the chainsaw 8. An electronically actuatable chain brake 24 is operatively connected to the controller 18, allowing the controller 18 to activate the chain brake 24 to stop the saw chain 20.

Figure 2:
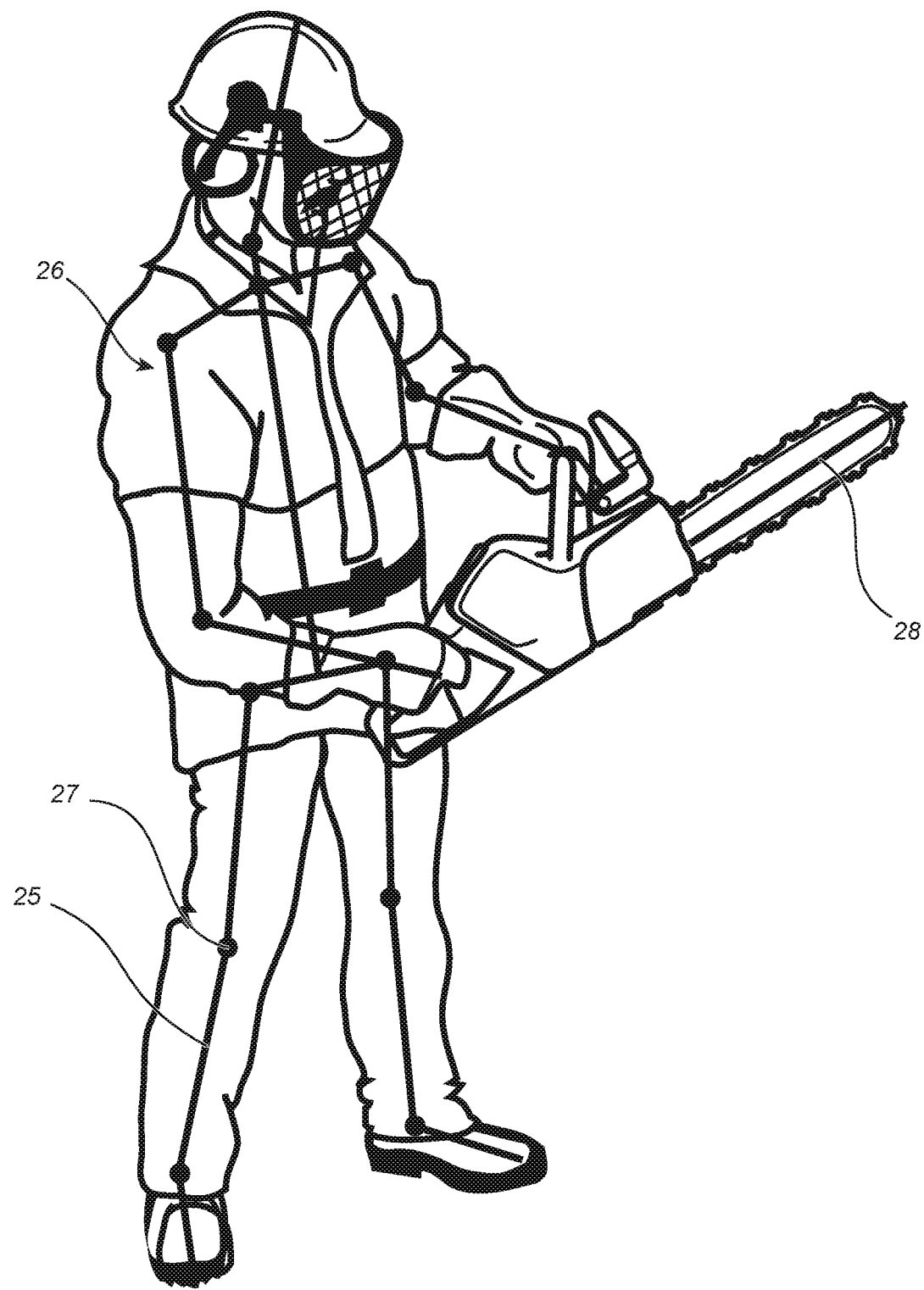
FIG. 2 is a schematic view in perspective of skeleton models applied to the operator and chainsaw of FIG. 1.

When the operator 6 moves his limbs, the wearable position sensors 12a-e transmit motion data to the controller 18 which, based on the movement pattern, fits the position sensors 12a-e onto an operator skeleton model 26 representing the operator 6, which is illustrated in FIG. 2. Thereby, once fit to the operator skeleton model 26, the positions of the position sensors 12a-e relative to each other have been determined, and any change in position of any of the wearable position sensors 12a-e will be updated by the respective wearable position sensors 12a-e transmitting their motion data to the controller 18. The operator skeleton model 26 comprises a plurality of rigid bars 25 interconnected by a plurality of joints 27. The model may further comprise respective constraints associated with each of the joints, such as available bending directions and bending angle ranges.

Similarly, when the operator 6 grabs the chainsaw 8 by the chainsaw handles, and starts moving it, the controller 18 detects the motion of the chainsaw 8 and automatically fits the position of the chainsaw 8 to the operator skeleton model 26. The chainsaw position may be fitted to the operator's skeleton model 26 based on the relative positions between the sensors 12b, 12c in the gloves 16b, 16c, such that a working implement skeleton model 28, representing the saw chain 20, may be obtained and positioned in relation to the operator skeleton model 26. Once the working implement skeleton model 28 has been positioned in relation to the operator skeleton model 26, any change in position of the saw chain 20 in relation to the operator 6 will be updated by the power tool position sensor 14 by transmitting its motion data to the controller 18.

Figure 3:
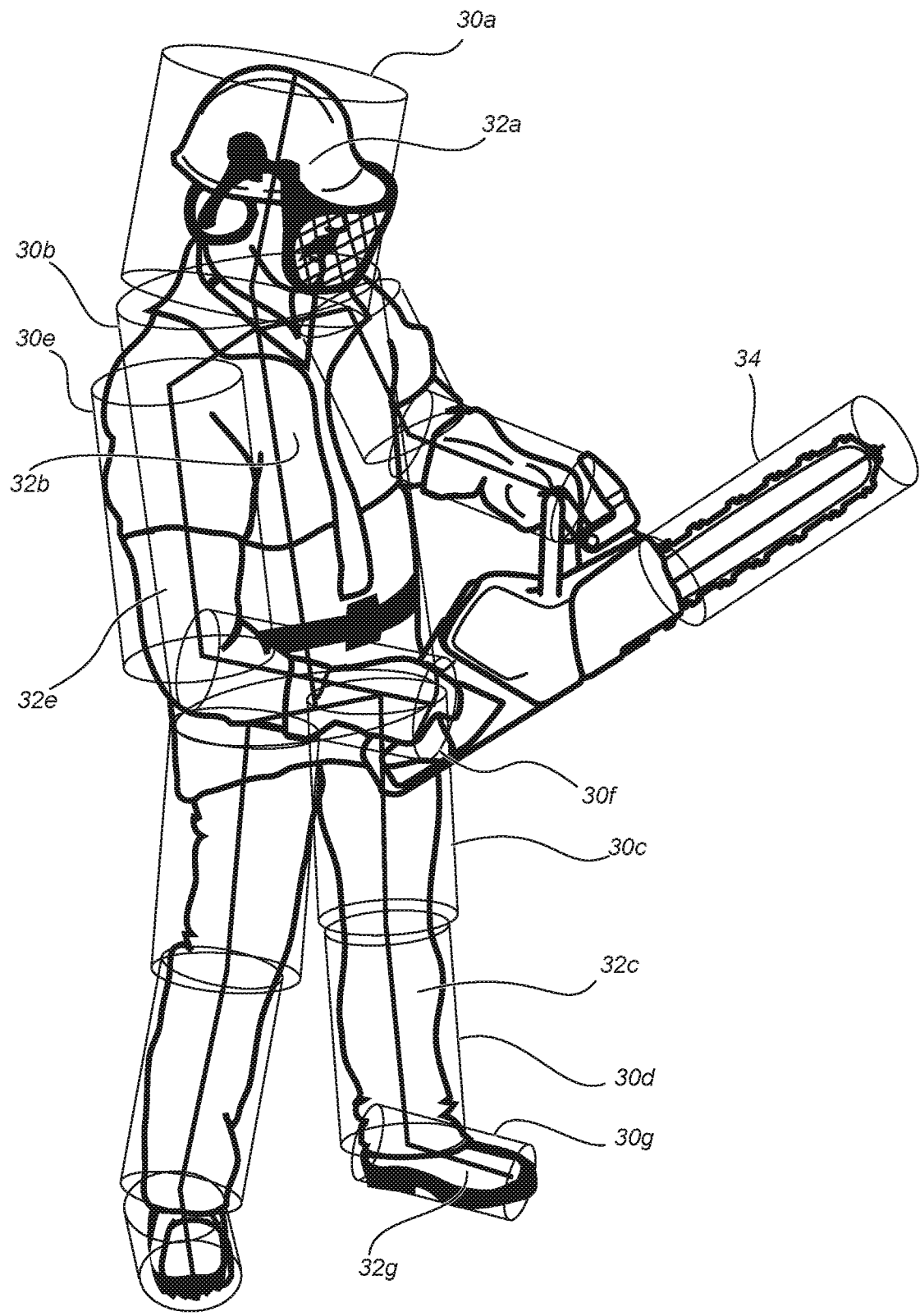
FIG. 3 is a schematic view in perspective of a plurality of protection volumes and a working implement volume applied to the operator and chainsaw of FIG. 1.

Turning now to FIG. 3, once the skeleton models 26, 28 have been established, the controller 18 associates the operator skeleton model 26 with a plurality of protection volumes 30a-30g, wherein each protection volume encloses a respective body part of the operator 6. By way of example, the operator's head 32a may be associated with a respective head protection volume 30a, the operator's torso 32b may be associated with a respective torso protection volume 30b; each of the operator's legs 32c may be associated with two respective leg protection volumes 30c, 30d; each of the operator's arms 32e may be associated with two respective arm protection volumes 30e, 30f; and each of the operator's feet 32g may be associated with a respective foot protection volume 30g. In the illustrated example, each of the protection volumes 30a-g has a circular-cylindrical shape centred around a respective rigid bar 25 (FIG. 2) of the skeleton model 26, even though other shapes are also possible. The cylindrical protection volumes 30a-g may have different respective radii depending on the body parts they're associated with. Moreover, the radii may be set based on e.g. the size of the workwear, which size the workwear may be configured to wirelessly communicate to the controller 18.

Similarly, the controller associates the saw chain 20 with a working implement volume 34 enclosing the guide bar 22 and saw chain 20. Also the working implement volume 34 has a circular-cylindrical shape centred on the working implement skeleton model 28.

Figure 4:
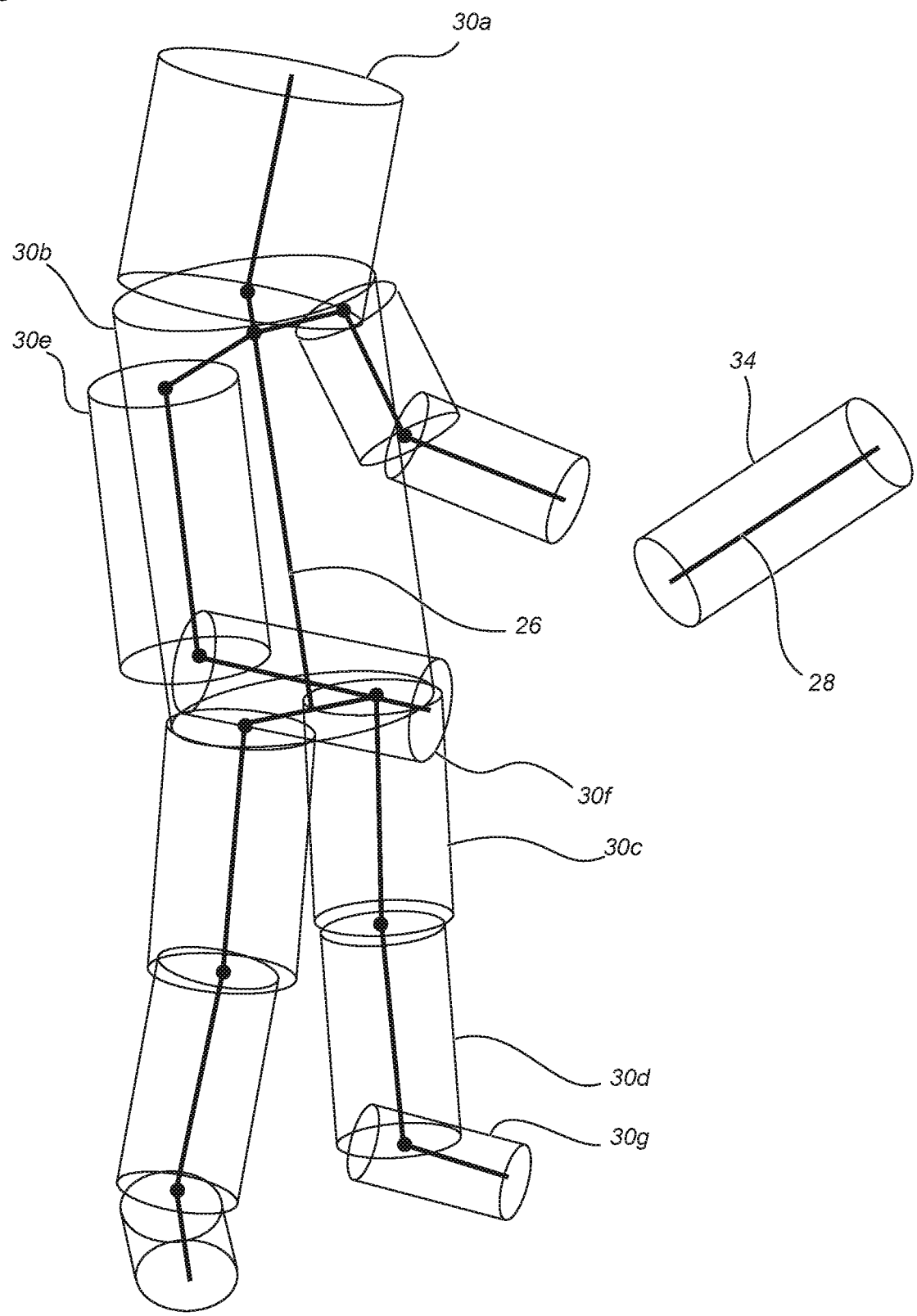
FIG. 4 is a schematic view in perspective of the skeleton models, protection volumes, and working implement volume of FIGS. 2 and 3.

FIG. 4 illustrates the skeleton models 26, 28 along with the protection volumes 30a-g. When any part of the working implement volume 34 overlaps with a protection volume 30a-g, there is an imminent danger that the saw chain 20 may enter the protection volume 30a-g. As soon as the controller 18 identifies such an overlap, it generates a protection signal. The protection signal is wirelessly transmitted to a speaker within an ear cup 36 (FIG. 1) of the operator's hearing protection. Moreover, the protection signal activates the electronically actuatable chain brake 24, to immediately stop the saw chain 20. Moreover, whenever the controller 18 determines that the working implement volume 34 approaches a protection volume 30a-g at a speed exceeding a limit speed, the controller 18 generates the protection signal already when the working implement volume 34 has come within a safety distance from the protection volume 30a-g. The safety distance may be set depending on the speed at which the working implement volume 34 approaches the protection volume 30a-g.

The power tool operator protection system 10 (FIG. 1) may also be used for protecting other people near the operator. An adjacent person (not illustrated), such as another chainsaw operator, may wear a similar set of wearable sensors, which may transmit position data to the controller 18. Based on position data from the wearable sensors of the adjacent person, the controller 18 may generate a similar skeleton model of the adjacent person, and associate that model with respective protection volumes of the limbs of the adjacent person.

Figure 5:
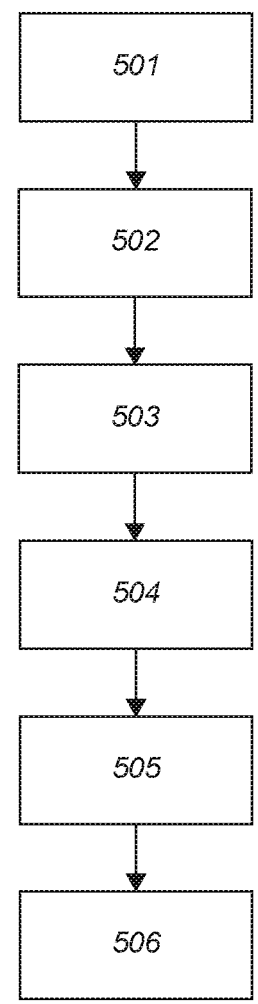
FIG. 5 is a flow chart illustrating a method of protecting an operator of a handheld power tool from injury.

The flow chart of FIG. 5 illustrates a method of operating the power tool operator protection system 10.

In step 501, position data is received from the wearable position sensors 12a-e worn by the operator 6.

In step 502, position data is received from the power tool position sensor 14.

In step 503, a model 26 of the operator 6, representing the operator's posture and being based on the mutual positions of the respective wearable sensors 12a-e, is generated based on the position data received from the wearable position sensors 12a-e.

In step 504, each limb of a plurality of limbs of the operator 6 is associated with a respective protection volume 30a-g.

In step 505, a position of the working implement 20 of the power tool 8 is determined based on the position data received from the power tool position sensor 14.

In step 506, a protection signal is generated in response to the position and/or motion of the power tool 8 in relation to the protection volume 30a-g indicating an imminent danger that the working implement 20 enters a protection volume 30a-g.

The invention has mainly been described above with reference to a few embodiments. However, as is readily appreciated by a person skilled in the art, other embodiments than the ones disclosed above are equally possible within the scope of the invention, as defined by the appended patent claims. In the claims, the word "comprising" does not exclude other elements or steps, and the indefinite article "a" or "an" does not exclude a plurality.

The invention claimed is:

1. A power tool operator protection system comprising
a plurality of wearable position sensors configured to be worn by an operator of a handheld power tool;
a power tool position sensor configured to detect the position of a handheld power tool; and
processing equipment configured to:
receive position data from the wearable position sensors and the power tool position sensor;
based on the position data received from the wearable position sensors, generate a model of the operator, the model representing the operator's posture and being based on the mutual positions of the respective wearable sensors relative to each other;
associate each limb of a plurality of limbs of the operator, as represented by the model, with a respective protection volume;
based on the position data received from the power tool position sensor, determine a position of a working implement of the power tool; and
based on the position and/or motion of the power tool in relation to the protection volume indicating an imminent danger that the working implement enters a boundary of the protection volume, generate a protection signal,
wherein the boundary of each protection volume is defined by a radius measured from a longitudinal centerline of the protection volume.

2. The power tool operator protection system according to claim 1, wherein the processing equipment is further configured to:
associate the working implement of the power tool with a working implement model; and
determine whether there is an imminent danger that the working implement model overlaps with a protection volume.

3. The power tool operator protection system according to claim 1, wherein the processing equipment is further configured to:
associate the working implement of the power tool with a working implement volume; and
determine whether there is an imminent danger that the working implement volume overlaps with a protection volume.

4. The power tool operator protection system according to claim 1, wherein the processing equipment is further configured to:
determine a speed at which the working implement approaches a protection volume, and
adapt a safety distance for generating the protection signal based on the determined speed.

5. The power tool operator protection system according to claim 1, wherein the processing equipment is configured to, based on the protection signal, stop the working implement of the power tool.

6. The power tool operator protection system according to claim 1, wherein the processing equipment is configured to, based on the protection signal, generate an alert to the operator.

7. The power tool operator protection system according to claim 1, wherein each of the operator's legs is associated with a respective protection volume.

8. The power tool operator protection system according to claim 1, wherein the position sensors are configured to determine an absolute position in space.

9. The power tool operator protection system according to claim 1, wherein each respective position sensor of said position sensors is configured to determine a relative position in space, said relative position being relative to the other position sensors.

10. The power tool operator protection system according to claim 1, wherein the power tool position sensor is further configured to detect an orientation of the power tool.

11. The power tool operator protection system according to claim 1, wherein each of said wearable position sensors comprises an inertial measurement unit, such as a gyroscope or an accelerometer.

12. The power tool operator protection system according to claim 1, further comprising an RTK, real-time kinematic, base station, wherein each of said wearable position sensors comprises an RTK enabled GNSS receiver.

13. The power tool operator protection system according to claim 1, further comprising a plurality of radio beacons, wherein each of said wearable position sensors comprises a respective radio interface, the position of the wearable position sensors being determined by detected distances from the respective wearable position sensors to each of said radio beacons.

14. The power tool operator protection system according to claim 1, wherein the position of each limb is determined based on input from several different sensors.

15. The power tool operator protection system according to claim 1, wherein the processing equipment is configured to determine the position of one body part based on position data from a wearable position sensor attached to another body part.

16. The power tool operator protection system according to claim 1, further comprising an electronically actuated working implement brake connected to the power tool, wherein the working implement brake is configured to, based on the protection signal, mechanically engage to stop a motion of the working implement.

17. The power tool operator protection system according to claim 1, wherein the wearable position sensors are integrated into workwear including a jacket, trousers, gloves, headwear or boots, wherein the workwear is protection wear configured to mechanically protect the operator from injury, and wherein the protection wear is chainsaw protection wear including a chainsaw protection helmet, chainsaw protection trousers, or chainsaw protection boots.

18. The power tool operator protection system according to claim 1, wherein the processing equipment is configured to:
receive position data from wearable position sensors worn by an adjacent person;
based on the position data received from the wearable position sensors of the adjacent person, generate a model of the adjacent person, the model representing the adjacent person's posture and being based on the mutual positions of the respective wearable sensors of the adjacent person relative to each other;
associate each limb of a plurality of limbs of the adjacent person, as represented by the model of the adjacent person, with a respective protection volume of the adjacent person; and
based on the position and/or motion of the power tool in relation to the protection volume of the adjacent person indicating an imminent danger that the working implement enters a protection volume of the adjacent person, generate a protection signal.

19. A method of protecting an operator of a handheld power tool from injury, the method comprising:
receiving position data from wearable position sensors worn by the operator;
receiving position data from a power tool position sensor;
based on the position data received from the wearable position sensors, generating a model of the operator, the model representing the operator's posture and being based on the mutual positions of the respective wearable sensors relative to each other;
associating each limb of a plurality of limbs of the operator, as represented by the model, with a respective protection volume;
based on the position data received from the power tool position sensor, determining a position of a working implement of the power tool; and
based on the position and/or motion of the power tool in relation to the protection volume indicating an imminent danger that the working implement enters a boundary of the protection volume, generating a protection signal,
wherein the boundary of each protection volume is defined by a radius measured from a longitudinal centerline of the protection volume.

20. The power tool operator protection system of claim 1, wherein each protection volume comprises a respective radius based on the limb of the plurality of limbs with which each protection volume is associated.

* * * * *